F. SMILEY.
PRUNING-SHEARS.
No. 182,236. Patented Sept. 12, 1876.
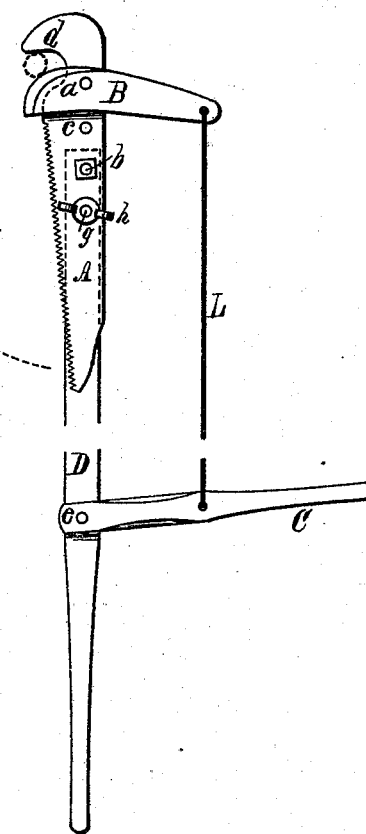
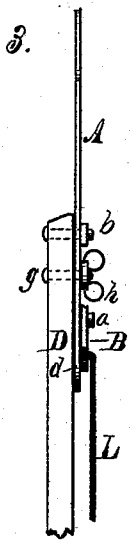
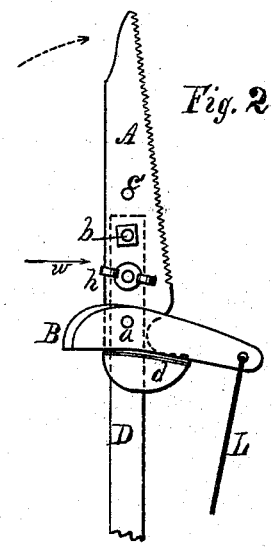
Witnesses:
W. L. Palmer
Harmon Garton
Inventor:
Frank Smiley.
by E. B. Whitmore, Atty.

UNITED STATES PATENT OFFICE.

FRANK SMILEY, OF BATAVIA, NEW YORK, ASSIGNOR OF ONE-HALF OF HIS RIGHT TO RODERIC F. THOMPSON, OF SAME PLACE.

IMPROVEMENT IN PRUNING-SHEARS.

Specification forming part of Letters Patent No. 182,236, dated September 12, 1876; application filed July 14, 1876.

*To all whom it may concern:*

Be it known that I, FRANK SMILEY, of Batavia, in the county of Genesee and State of New York, have invented a new and useful Improvement in Pruning-Shears, which improvement is fully set forth in the following specification, reference being had to the accompanying drawing.

Figure 1 is a side elevation showing the reversible saw folded back as when the implement is designed to be used as a shear. Fig. 2 shows the same with the saw extended or reversed. Fig. 3 is an elevation of the same, viewed as indicated by the arrow $w$ in Fig. 2.

The object of my invention is to combine a pruning-shear and reversible pruning-saw, so that the heel of the latter shall form a part of the shear; and it consists mainly in pivoting a suitable cutting-blade upon the side and near the heel of the saw, the said heel portion being cut out to form a jaw of the shear, both of which are mounted upon the end of a stock or handle of any desired length, as will be hereinafter more fully described and definitely claimed.

In the drawing, A is a saw formed throughout of sheet-steel, having its heel $d$ cut out to form a jaw of the shear. B is a sheet-steel cutting-blade held to the saw by the pivot-rivet $a$. C is a hand-lever pivoted to the stock D, at $e$, and is connected to the cutting-blade B, by the rod L, by means of which the shear is operated. The saw is held upon the stock D by the pivot-bolt $b$, upon which the saw turns when being reversed. It is also further held to the stock by the clamping-screw $g$ and thumb-nut $h$, the former of which passes through or into the stock, and through the hole $c$, or $c'$, in the saw, according to its position. The holes $c$ and $c'$ are made equidistant from, and on opposite sides of, the pivot-bolt $b$, so that one or the other will correspond with the hole in the stock through which the screw $g$ passes, when the saw is turned to either position indicated, the screw $g$ being removed for the purpose.

The dry dead limbs of fruit and other trees are often very hard, and a pruning-shear, unless made awkwardly heavy, is liable to be strained or broken in an attempt to cut them, while they may be easily cut through with a light thin saw.

By the combination above described, I am enabled to produce a pruning-implement that will answer to cut all kinds of limbs, made particularly light, as the saw-blade forms part of the shear.

I claim as my invention—

1. In a pruning-implement, a combined pruning-shear and pruning-saw, in which the heel of the latter is shaped to form a jaw of the shear, substantially as herein described and shown.

2. A reversible pruning-saw, having holes $c$ and $c'$ equidistant from the pivot-hole, which saw forms one of the blades of a pruning-shear, in combination with a pivot-bolt, $b$, clamping-screw $g$, and stock D, substantially as shown and described.

FRANK SMILEY.

Witnesses:
E. B. WHITMORE,
WM. M. BENNETT.